W. F. TRACY.
VALVE.
APPLICATION FILED APR. 6, 1917.
1,246,187.
Patented Nov. 13, 1917.
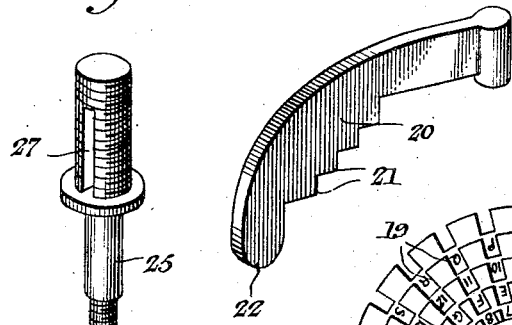
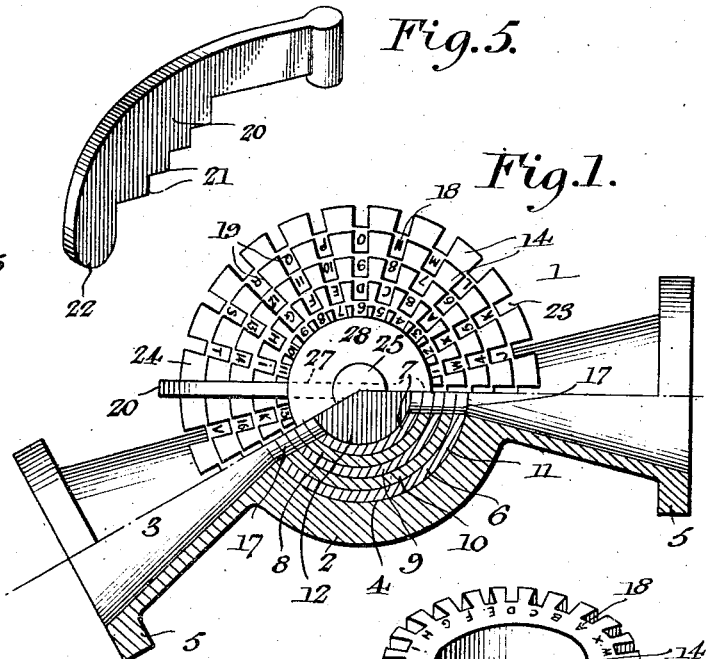
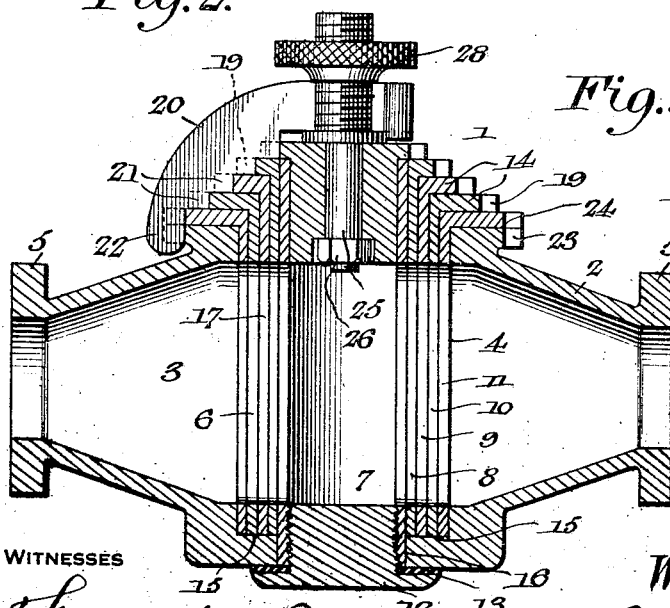
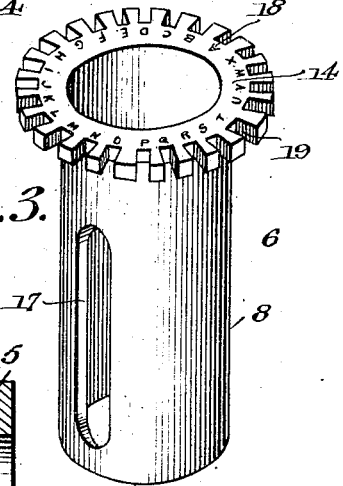
WITNESSES
Frederick W. Ely
INVENTOR
William F. Tracy,
BY Victor J. Evans
ATTORNEY

UNITED STATES PATENT OFFICE.

WILLIAM F. TRACY, OF PHILADELPHIA, PENNSYLVANIA, ASSIGNOR OF ONE-HALF TO WILLIAM H. GROSS, SR., OF PHILADELPHIA, PENNSYLVANIA.

VALVE.

1,246,187.     Specification of Letters Patent.     Patented Nov. 13, 1917.

Application filed April 6, 1917. Serial No. 160,221.

*To all whom it may concern:*

Be it known that I, WILLIAM F. TRACY, a citizen of United States, residing at 2556 N. Gratz St., Philadelphia, in the county of Philadelphia and State of Pennsylvania, have invented new and useful Improvements in Valves, of which the following is a specification.

This invention relates to valves, and has for an object to provide a valve having a plug structure, embracing novel features of design which can be so adjusted as to prevent unauthorized persons from manipulating the valve with a view of permitting of its use.

Another object of the invention resides in a valve primarily adapted for use upon motor vehicles, so that when the latter are left unattended, the valve may be regulated so as to guard against and to prevent the vehicle from being illicitly employed or stolen.

With these and other objects in view, as will appear as the description proceeds, the invention consists in the features of construction, combination of elements and arrangement of parts, hereinafter fully set forth, illustrated in the accompanying drawing, and more particularly pointed out in the appended claims.

In the drawing—

Figure 1 is a partial top plan view and horizontal cross section of the valve comprising the preferred form of the present invention.

Fig. 2 is a vertical longitudinal sectional view of the valve, the plane of which being disclosed by the line 2—2 of Fig. 1.

Fig. 3 is a perspective view of one of the plug elements employed by the valve.

Fig. 4 is a similar view of the locking-plate attaching bolt, and

Fig. 5 is a detail view of the locking plate.

Similar characters of reference denote corresponding parts throughout the several views of the drawing.

Referring more particularly to the drawing, the numeral 1 designates the valve comprising the preferred form of the invention in its entirety, said valve including a casing 2 having a fluid passage way 3 passing therethrough. The central portion of the casing is substantially circular in cross section so as to provide the interior thereof with an annular plug seat or chamber 4, the latter perpendicularly intersecting the passage way 3. It will be observed, upon an inspection of the drawing, that the passage way 3 where it communicates with the chamber 4 is of slot-like configuration, and that it gradually tapers from this design to assume substantially circular contours adjacent to its inlet and outlet extremities. The latter may be provided with annular collars 5 to conveniently effect its relation with communicating ducts or pipes. In the present embodiment of the invention the inlet and outlet extremities of the passage way are angularly disposed, however, this design is merely employed when the valve is utilized in connection with certain mechanisms, which make this arrangement necessary, as it is apparent that the said extremities may be disposed in alinement if found expedient.

Alluding to the essential part of the invention, use is made of a plug structure 6, which is designed to occupy the chamber 4, said structure in its preferred form consisting of a plurality of telescoping tubular elements 7, 8, 9, 10 and 11, all of which being disposed in concentric relation. The element 7 passes centrally through the casing, and is provided with internal threads to receive a nut 12, the latter being threaded into the element and has formed on the lower end thereof an enlarged head, which is adapted to engage with a gasket 13, interposed between the head and the casing 2. The upper extremities of the elements protrude beyond the casing to various heights, that is, the elements decrease in height from the element 7 to the element 11, as will be clearly perceived by reference to Fig. 2 of the drawing. Formed with or secured to the upper extremities of the elements are manipulating collars 14, which are arranged in superposed or overlapping relation, and gradually diminish in diameter from the element 11 to the element 7, so that the peripheral edges of the collars will be exposed in stepped relation, so that each element may be separately rotated within the chamber 4. The elements 8, 9, 10 and 11 have the lower edges thereof resting upon the surface 15 of the chamber 4, while the lower portion of the element 7 is positioned within an extended bore 16, communicating with said chamber, so as to make connection with the nut 12. By this construction it will be patent that by associating the nut 12 with the element 7, the plug structure as a whole will be secured or clamped within the chamber 4, but not in a sufficiently rigid manner to interfere with the manual rotation of the elements of the plug structure. Usually the nut 12 is so firmly connected with the element 7 that its removal from the latter element cannot be readily effected.

Each of the plug elements have formed therein a plurality of vertically extending slots 17, which are adapted to register at proper periods with the passage way 3 to permit of the flow of fluid through the valve. The slots can be brought into registration with the passage way by manually revolving the elements of the plug structure, but if one of the elements should have the slots thereof out of alinement with the balance of the slots formed in the coöperating elements, the flow of fluid through the valve will be effectively obstructed.

To permit of one having knowledge of the valve to conveniently and expeditiously adjust the plug elements in order to register the passage way and slots, the collars 14 have suitably indicated thereon at spaced intervals, symbols or characters 18, which when arranged in a certain predetermined order, the elements will be in a position to permit of the unobstructed passage of fluid through the valve. However, if for any reason the proper attendant of the valve desires to close the same and to prevent others from opening it during his absence, the elements are rotated so that the slots thereof will be out of alinement with the passage way 3, and when thus positioned it will be practically impossible for one unacquainted with the proper combination for setting the plug elements in a position to open the valve.

In order to retain the slots 17 in registration with the passage way 3 while the valve is being utilized, so as to prevent undue rotation of the same, the collars 14 are provided with notches 19 in the peripheral edges thereof, and adapted to be received within the notches, when the latter are alined in a certain manner, is a locking plate 20. The plate is provided with stepped projections 21 which are inserted into the notches, and with a reduced lower extremity 22 which is operable to fit within notches 23, formed in the upper circumferential surface 24 of the casing 2, and disposed in alinement with the notches 19. As a result of this construction it will be evident that the elements of the plug structure cannot be rotated while the locking plate is in coöperation therewith. The plate may be retained in its active position by providing the main plug element 7 with a bolt element 25, the latter being rigidly secured by means of a nut 26 to the element 7. A slot 27 is formed in the bolt 25, and in which is received the upper end of the locking plate. A binding nut 28 is threaded upon the bolt and frictionally retains the plate in fixed relation with the notches 19 and 23.

From the foregoing description of the details of the valve, it is thought that the following description in relation to its use and operation, will be readily comprehended. The preferred use of the invention resides in its employment as an anti-theft measure of preventing the surreptitious use of unattended motor vehicles. When utilized in this capacity the valve is attached to an explosive engine (not shown) at a position between the carbureter and intake manifolds thereof, so as to regulate the flow of the combustive mixture through the carbureter to said manifolds. Now in the event of the vehicle operator leaving the machine unguarded, the latter may be prevented from being used by unauthorized persons by simply manipulating the elements of the plug structure, so as to obstruct the flow of fluid therethrough, this being effected by revolving one or more of the plug elements. Thus upon an illicit endeavor to operate the machine, it will first be necessary to open the valve which, owing to its peculiar construction, will be practically impossible for one not having a knowledge of the proper combination of characters to effect such an adjustment of the plug elements. In view of the foregoing it will be evident that there is provided a valve in which the objects of the present invention have been achieved, and that all of the advantageous features above mentioned are, among others, present. The valve can be cheaply fabricated, readily attached to the average engine of a motor vehicle, and by its simple construction will not be liable to become out of order to cause any annoyance whatever to those properly acquainted with its peculiarities of operation. It will of course be understood that slight structural changes may be made in the construction of the invention from that illustrated, and above described. For instance, such as varying the number of rotatable elements of the plug structure, or by forming the collars 14 separately from the elements in place of being integrally formed therewith, and that these changes, among others, of a similar character, will not depart from the general scope or intent of the invention.

Having described the invention what is claimed as new and patentable is:

1. A valve including a casing having an inlet and outlet passage, a plug seat intersecting said passage and including an annular flange at the base of the casing, a tubular member fitted within said seat and having slots therein, said member being interiorly threaded, a nut threaded within said tubular member and having an enlarged head engaging the adjacent exterior surface of the casing, means for closing the opposite end of said tubular member, and a plurality of telescopic elements concentrically disposed about said tubular member and having slots adapted to register with the slots of said member when the valve is open, said elements resting upon the flange, collars provided upon the opposite ends of said elements and located exteriorly of the casing to permit of their manual manipulation.

2. A valve comprising a casing having an inlet and outlet passage, a plug seat intersecting said vessel and including an annular flange at the base of the casing, a tubular member fitted within said seat and having slots, a nut threadedly associated with the lower end of said member for closing the latter, a plurality of telescopic elements concentrically disposed about the tubular member and resting upon said flange, said elements having slots adapted to register with the slots of said member, collars provided upon said elements and located exteriorly of the casing to permit of their manual manipulation, indicia on said collars to indicate the positions of the slots of said elements, a closure for the opposite end of said member, and means carried by the closure and coöperating with said collars to prevent relative rotation of said members from a given position.

3. A valve comprising in combination, a casing having an inlet and outlet passage, a plug seat intersecting said passage, a plurality of concentrically disposed telescopic elements fitted within said seat and having slots adapted to be brought into registration when the valve is opened, collars provided upon said elements and located exteriorly of the casing to permit of their manual manipulation, said collars being disposed in stepped relation and provided with notches, a plug closing the innermost of said elements, and a locking member carried by said plug and designed to engage in said notches to hold said elements fixed relatively in a given position.

4. A valve comprising in combination, a casing having an inlet and outlet passage, a plug seat intersecting said passage, a plurality of concentrically disposed elements fitted in said seat and having slots formed therein to register with said passage, collars formed on said elements and located exteriorly of the casing to permit of their manual manipulation, a member closing the upper ends of the innermost element, said collars being disposed in stepped relation and having notches, a bolt projecting from said member and having a threaded portion longitudinally slotted, a curved arm passed through said slot of the bolt and designed to engage in certain of the alined notches of said collars to hold said members fixed relatively in a given position, and a nut associated with said bolt to hold said arm in operative position.

In testimony whereof I affix my signature.

WILLIAM F. TRACY.